United States Patent [19]

Jennette

[11] Patent Number: 4,512,415
[45] Date of Patent: Apr. 23, 1985

[54] PULL PLOW WITH PULL HANDLES AND RUNNERS AND AUTOMOBILE SELECTIVELY ATTACHED TO PLOW

[76] Inventor: William S. Jennette, 1707 Parkview Dr., Elizabeth City, N.C. 27909

[21] Appl. No.: 600,896

[22] Filed: Apr. 16, 1984

[51] Int. Cl.³ .......................... A01B 3/02; A01B 3/26; A63H 33/30
[52] U.S. Cl. .................................. 172/360; 172/368; 446/427
[58] Field of Search ............... 172/358, 360, 764, 331, 172/367, 368, 369, 393, 677, 754; 446/424, 427, 434

[56] References Cited

U.S. PATENT DOCUMENTS 2,974,428  3/1961  Krasner ........................ 172/358 X

FOREIGN PATENT DOCUMENTS 73847   10/1944  Czechoslovakia ................ 172/358
755973   9/1933  France ........................ 172/360
59389    5/1938  Norway ........................ 172/360

Primary Examiner—Richard T. Stouffer

[57] ABSTRACT

This plow is unique, in that it is pulled manually, and is designed for garden use. Primarily, it consists of an aluminum frame with a pair of handle grips on one end, and the other end includes a plow blade attached to the center of the frame. It further includes a pair of runners, which support the frame on the ground surface. In one embodiment of the plow, when it is not being manually operated, the plow may be pulled in the opposite direction by a toy vehicle operated by a child.

1 Claim, 4 Drawing Figures

U.S. Patent  Apr. 23, 1985  4,512,415
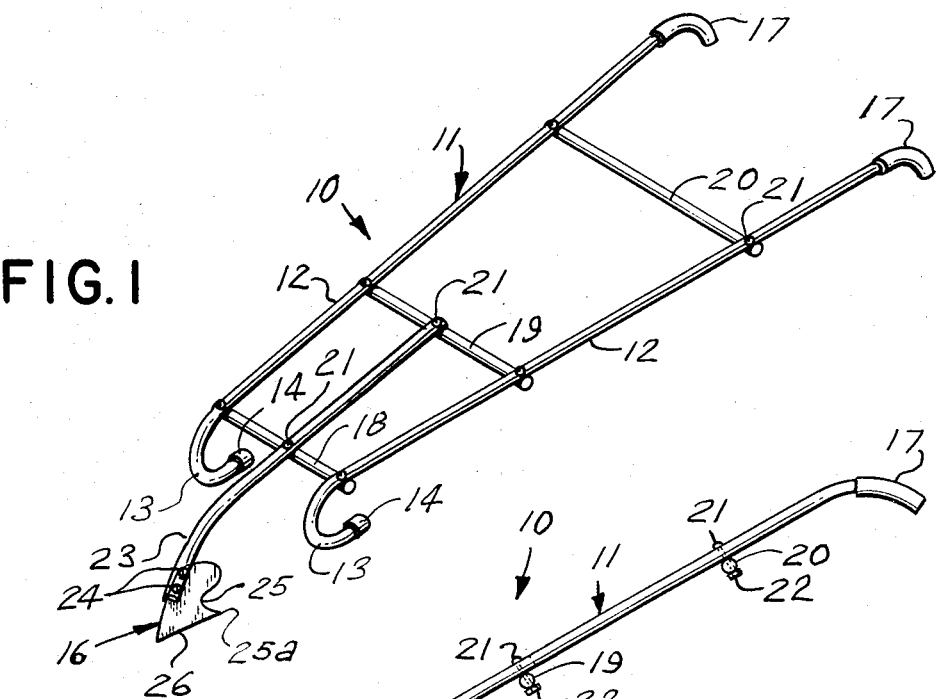
FIG. 1
FIG. 2
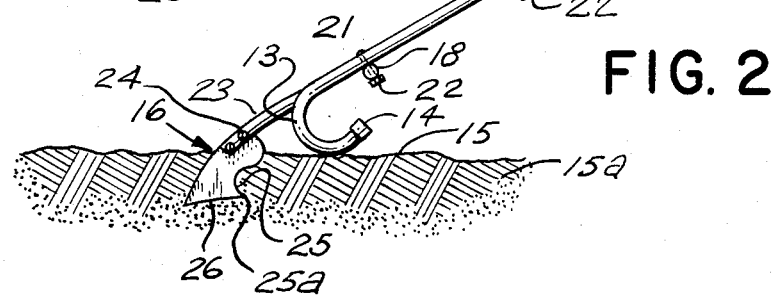
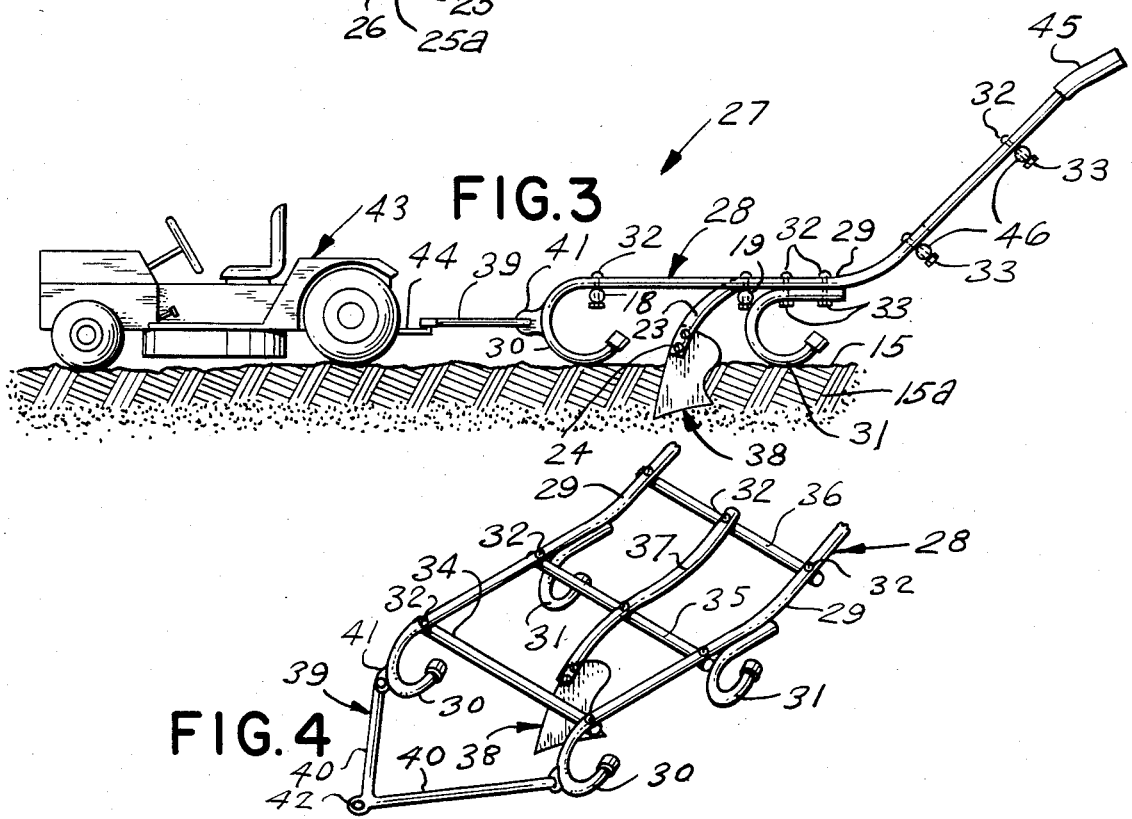
FIG. 3
FIG. 4

PULL PLOW WITH PULL HANDLES AND RUNNERS AND AUTOMOBILE SELECTIVELY ATTACHED TO PLOW

This invention relates to farm and garden tools, and more particularly to a pull plow.

The principal object of this invention is to provide a pull plow, which will be adaptable for use for flower beds, etc.

Another object of this invention is to provide a pull plow, which will be so designed, as to be manually pulled by small child, because of its ease in handling.

Another object of this invention is to provide a pull plow, which, when not being manually operated, may be pulled in the opposite direction by a toy vehicle operated by a child.

Other objects are to provide a pull plow, which is simple in design, inexpensive to manufacture, rugged in construction, easy to use, and efficient in operation.

These, and other objects, will be readily evident, upon a study of the following specification, and the accompanying drawing, wherein:

FIG. 1 is a perspective view of the present invention;

FIG. 2 is a side-view of FIG. 1, shown in use;

FIG. 3 is a side view of a modified form of the invention, and

FIG. 4 is a fragmentary perspective view of FIG. 3.

Accordingly, a plow 10 is shown to include a frame 11, composed of a pair of tubular side members 12, which are angularly disposed towards each other at the rear of plow 10. The front ends of side members 11 are terminated by downwardly extended arcuate portions 13, which are capped by means of plastic caps 14, and portions 13 serve as runners or skids upon the ground surface 15, so as to support the plow blade 16 properly. The opposite ends of members 12 are also arcuately curved, and serve as handle grips for plow 10, and are covered by a tubular plastic material 17, for comfort to the user's hands. Three tubular cross-bar members 18, 19, and 20 are fixedly secured to the bottom of side members 12, by bolt fasteners 21, and nut fasteners 22. Members 18, 19, and 20 are spaced from each other, and a central and rearwardly projecting plow member 23 is also of tubular construction, and is fixedly secured to the top centers of members 18 and 19, by fasteners 21 and 22. The rearward portion of member 23 is slightly curved downwards, and the plow blade 16 is fixedly secured, at its top portion, to the projecting end of member 23, by suitable fasteners 24. Plow blade 16 is provided with an arcuate cut-out 25 at its lower front portion, for engagement with the soil 15a, and the bottom edge 26 of blade 16 is slightly concave in configuration, extending to a point 25a.

In use, the operator grasps the handle grips of plow 10 at 17, and lifts upwards on them, which engages plow blade 16 within the soil 15a. The operator then proceeds to plow a row in soil 15a, by pulling plow 10.

Looking now at FIGS. 4 and 5, a modified form of plow 27 is shown to include a frame 28, consisting of a pair of side members 29 parallel with each other, which curve upwards at the front. The rearward ends 30 of side members 29 are arcuately curved downwards, and form runners for plow 27 on ground surface 15. A second pair of curved members 31 serve as runners also, and are fixedly secured to the bottoms of side members 29 by bolt fasteners 32 and nut fasteners 33. Three cross-bar members 34, 35, and 36 are spaced from each other, and are fixedly secured to members 29 by fasteners 32 and 33. A plow member 37 is secured fixedly to members 35 and 36 by similar fasteners 32 and 33, and its projecting end is arcuately curved downwards, and is fixedly secured to a plow blade 38, which is similar in form to blade 16, heretofore described of plow 10. A "V"-shaped member 39 is fixedly secured, at the ends of its leg portions 40, to a lug 41, which is fixedly secured, in a suitable manner, to end 30, and the opposite end of member 39 includes an opening 42, for being hitched to a child's toy automobile 43 by a trailer hitch 44, which is suitably attached thereto. The hitch 44 is constructed in the same manner as the common full size hitch, for full size automotive vehicles.

The opposite ends of members 29 extend upwards, and are terminated with plastic material 45, and serve as handle grips for the manual operation of flow 27. Cross-bar members 46 are also provided for upward extending portions of members 29, and are fixedly secured thereto by fasteners 32 and 33.

In operation, plow 27 functions in the same manner as was heretofore described of plow 10, when it is manually pulled by the use of its handle grips, which are covered with material 45. When it is not being manually operated, a child can sit in the toy automobile 43, which is electrically powered, and the child will operate 43, which will pull plow 27 in the opposite direction, for plowing soil 15a, by the automobile being hooked by hitch 44 to the member 39 thereof.

While various changes may be made in the detail construction, it is understood that such changes will be within the spirit and scope of the present invention, as is defined by the appended claims.

What I now claim is:

1. A pull plow, comprising, in combination, a frame formed of a pair of forwardly rearwardly extending, spaced-apart, parallel side members, and a plurality of transverse cross bar members secured therebetween, a forward end of said side members being upwardly angled to form pull handles, a rearward end of said side members being arcuately downwardly curved, and forming a pair of rear runners for travel upon a ground surface, a front pair of curved runners spaced forwardly of said rear runners, and being affixed to an underside of said side members; a plow member being fixedly secured on said frame, and including a plow blade affixed thereto, said plow blade being located under said frame, and being forwardly rearwardly positioned between said front and rear pairs of runners, said plow blade projecting downwardly lower than said runners; a hitch at a rear end of said frame, and a child's toy automobile selectively attachable to said hitch.

* * * * *